(12) United States Patent
Frank

(10) Patent No.: US 12,537,556 B2
(45) Date of Patent: *Jan. 27, 2026

(54) METHOD AND APPARATUS FOR NETWORK ASSIGNMENT OF THE USER EQUIPMENT TRANSMITTER LOCAL OSCILLATOR FREQUENCY

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 329 days.

This patent is subject to a terminal disclaimer.

(21) Appl. No.: 17/925,169

(22) PCT Filed: May 11, 2021

(86) PCT No.: PCT/IB2021/053974
§ 371 (c)(1),
(2) Date: Nov. 14, 2022

(87) PCT Pub. No.: WO2021/229413
PCT Pub. Date: Nov. 18, 2021

(65) Prior Publication Data
US 2023/0188174 A1    Jun. 15, 2023

Related U.S. Application Data

(63) Continuation of application No. 16/874,610, filed on May 14, 2020, now Pat. No. 10,951,255.

(51) Int. Cl.
*H04B 1/40* (2015.01)
(52) U.S. Cl.
CPC ..................... *H04B 1/40* (2013.01)
(58) Field of Classification Search
CPC ........ H04B 1/005; H04B 1/40; H04B 17/354; H04W 52/367; H04W 8/24
See application file for complete search history.

(56) References Cited

U.S. PATENT DOCUMENTS

| 2014/0066057 A1 | 3/2014 | Kazmi et al. |
| 2019/0059078 A1 | 2/2019 | Noh et al. |
| 2020/0059345 A1 | 2/2020 | Pelletier et al. |

OTHER PUBLICATIONS

PCT International Search Report for PCT/IB2021/053974, Lenovo (Singapore) Pte. Ltd., mailing date—Jul. 30, 2021.
(Continued)

*Primary Examiner* — Nader Bolourchi
(74) *Attorney, Agent, or Firm* — FIG. 1 Patents

(57) ABSTRACT

A method and apparatus are provided for assigning a user equipment transmitter local oscillator frequency including informing the network of a capability of the user equipment to adjust a frequency location of a transmit local oscillator of the user equipment, to a frequency location which has been indicated by the network, within a predefined channel frequency spectrum. The frequency location identification to be used to adjust the frequency location of the transmit local oscillator is received from the network. The frequency location of the local oscillator is then adjusted in accordance with the frequency location identification received.

20 Claims, 8 Drawing Sheets

(56) References Cited

OTHER PUBLICATIONS

3GPP TS 36.101 V16.5.0 (Mar. 2020), 3rd Generation Partnership Project; Technical Specification Group Radio Access Network; Evolved Universal Terrestrial Radio Access (E-UTRA); User Equipment (UE) radio transmission and reception (Release 16), 1884 pages.
MediaTek Inc., "More on flexible channel bandwidth consideration in NR", R4-1701810, for 3GPP TSG-RAN WG4 Meeting #82, Athens, Greece, Feb. 13-17, 2017.
MediaTek Inc., "NR UE sub-channel-bandwidth operation", R4-1705589, for 3GPP TSG-RAN WG4 Meeting #83, Hangzhou, China, May 15-19, 2017.
"Foreign Office Action", European Application No. 21726456.3, Jun. 16, 2025, 6 pages.

| FREQUENCY BAND (MHz) | CHANNEL BANDWIDTH / SPECTRUM EMISSION LIMIT (dBm) | MBW |
|---|---|---|
| | 5, 10, 15, 20 MHz | |
| 3400 ≤ f ≤ 3800 | -23 (NOTE 1, NOTE 3) | 5 MHz |
| | -40 (NOTE 2) | 1 MHz |
| NOTE 1: THIS REQUIREMENT APPLIES WITHIN AN OFFSET BETWEEN 5 MHz AND 25 MHz FROM THE LOWER AND FROM THE UPPER EDGE OF THE CHANNEL BANDWIDTH, WHENEVER THESE FREQUENCIES OVERLAP WITH THE SPECIFIED FREQUENCY BAND. NOTE 2: THIS REQUIREMENT APPLIES FROM 3400 MHz TO 25 MHz BELOW THE LOWER E-UTRA CHANNEL EDGE AND FROM 25 MHz ABOVE THE UPPER E-UTRA CHANNEL EDGE TO 3800 MHz NOTE 3: THIS EMISSION LIMIT MIGHT IMPLY RISK OF HARMFUL INTERFERENCE TO UE(S) OPERATING IN THE PROTECTED OPERATING BAND | | |

FIG. 2

| FREQUENCY BAND (MHz) | CHANNEL BANDWIDTH / SPECTRUM EMISSION LIMIT (dBm) | MBW |
|---|---|---|
| | | |
| 3400 ≤ f ≤ 3800 | -23 (NOTE 1, NOTE 3) | 5 MHz |
| | -40 (NOTE 2) | 1 MHz |
| NOTE 1: THIS REQUIREMENT APPLIES WITHIN AN OFFSET BETWEEN 5 MHz AND 25 MHz FROM THE LOWER AND FROM THE UPPER EDGE OF THE CHANNEL BANDWIDTH. NOTE 2: THIS REQUIREMENT APPLIES FROM 3400 MHz UP TO 25 MHz BELOW THE LOWER E-UTRA CHANNEL EDGE AND FROM 25MHz ABOVE THE UPPER E-UTRA CHANNEL EDGE UP TO 3800 MHz. NOTE 3: THIS EMISSION LIMIT CAN IMPLY RISK OF HARMFUL INTERFERENCE TO UE(S) OPERATING IN THE PROTECTED OPERATING BAND | | |

FIG. 3

| Channel bandwidth [MHz] | Parameters | Region A | Region B | Region C | Region D |
|---|---|---|---|---|---|
| 5 | | No A-MPR is needed for 5 MHz channel bandwidth | | | |
| 10 | RBstart | 0-13 | 0-17 | ≤ 6 | ≥ 12 |
| | L_CRB [RBs] | > 36 | 33-36 | ≤ 32 | ≤ 32 |
| | RBstart + LCRB [RBs] | N/A | N/A | N/A | ≥ 44 |
| | A-MPR [dB] | ≤ 4 | ≤ 3 | ≤ 3 | ≤ 3 |
| 15 | RBstart | 0-24 | 0-38 | ≤ 14 | ≥ 23 |
| | L_CRB [RBs] | > 50 | 37-50 | ≤ 36 | ≤ 36 |
| | RBstart + LCRB [RBs] | N/A | N/A | N/A | ≥ 59 |
| | A-MPR [dB] | ≤ 5 | ≤ 4 | ≤ 3 | ≤ 3 |
| 20 | RBstart | 0-35 | 0-51 | ≤ 21 | ≥ 31 |
| | L_CRB [RBs] | > 64 | 49-64 | ≤ 48 | ≤ 48 |
| | RBstart + LCRB [RBs] | N/A | N/A | N/A | ≥ 79 |
| | A-MPR [dB] | ≤ 5 | ≤ 4 | ≤ 3 | ≤ 3 |

FIG. 4

| CA_42C: CA_NS_08 | RBstart | Condition | RBend | L_CRB [RBs] | A-MPR for QPSK, 16 QAM, 64 QAM and 256 QAM [dB] |
|---|---|---|---|---|---|
| 100RB / 100RB | ≤ 21 | Or | ≥ 178 | ≤ 25 | ≤ 12 |
| | | | | > 25 and ≤ 80 | ≤ 6 |
| | | | | > 80 and ≤ 172 | ≤ 8 |
| | ≥ 0 | N/A | N/A | > 172 | ≤ 9 |
| | > 21 and ≤ 58 | Or | ≥ 141 and < 178 | < 48 | ≤ 3 |
| | > 21 | And | < 178 | ≥ 48 and ≤ 80 | ≤ 4 |
| 100RB / 75RB And 75RB / 100RB | ≤ 12 | Or | ≥ 162 | ≤ 25 | ≤ 12 |
| | | | | > 25 and ≤ 75 | ≤ 6 |
| | | | | > 75 and < 172 | ≤ 8 |
| | ≥ 0 | N/A | N/A | ≥ 172 | 9 |
| | > 12 and ≤ 49 | Or | ≥ 125 and < 162 | < 54 | ≤ 3 |
| | > 12 | And | < 162 | ≥ 54 and ≤ 75 | ≤ 5 |
| | > 49 | And | < 125 | ≥ 36 and ≤ 54 | ≤ 2 |
| 100RB / 50RB And 50RB / 100RB | ≤ 5 | Or | ≥ 144 | ≤ 16 | ≤ 12 |
| | | | | > 16 and ≤ 61 | ≤ 6 |
| | ≥ 0 | N/A | N/A | > 61 | ≤ 8 |
| | > 5 | And | < 144 | ≥ 36 and ≤ 61 | ≤ 5 |
| | > 5 and ≤ 41 | OR | ≥ 108 and < 144 | < 36 | ≤ 3 |
| 100RB / 25RB And 25RB / 100RB | ≤ 31 | Or | ≥ 92 | ≤ 34 | ≤ 4 |
| | | | | > 34 and ≤ 44 | ≤ 5 |
| | ≥ 0 | N/A | N/A | > 44 | ≤ 8 |

FIG. 5

METHOD AND APPARATUS FOR NETWORK ASSIGNMENT OF THE USER EQUIPMENT TRANSMITTER LOCAL OSCILLATOR FREQUENCY

FIELD OF THE INVENTION

The present disclosure is directed to a method and apparatus for network assignment of the user equipment transmitter local oscillator frequency. In some instances, the selection of a local oscillator frequency can be associated with a selection of one of one or more channels or bandwidth parts.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In connection with uplink transmissions, adjacent channel leakage and spurious emissions into adjacent channels can occur. For example, sometimes energy associated with the frequency of the linear oscillator which is internally used as a carrier signal can sometimes leak and find its way into the signal path associated with the system output. By way of further example, the location of the frequency of the linear oscillator can also impact the presence and location of an in-phase and quadrature (IQ) image, where the difference between the frequency location of the linear oscillator and the frequency of the signal being transmitted can affect the location of unwanted intermodulation products. The greater the difference, the wider the spread of the potential impact, such that proximate to a boundary of a channel frequency spectrum a transmitted signal can extend into another nearby channel space, such as the channel space of another provider. In order to address the potential for unwanted adjacent channel power, in some instances, a system may impose an additional maximum power reduction to help reduce the potential for impact in the form of unintended radiated energy into adjacent channels.

The present inventors have recognized that by better managing the frequency location of the local oscillator of the transmitter, it may be possible to better control the extent that unwanted power can leak into nearby channels. Further, it may be possible to define multiple channels and/or bandwidth parts, where upon selection of a particular one of the channels or bandwidth parts, the frequency of the local oscillator can be selected to help minimize the difference between its location and the selected transmit frequency, and correspondingly the extent that the adjacent channel power can deviate from the intended transmit frequency. In turn, this could allow the additional maximum power reduction that is identified as being needed for resource block locations at or near the edge of the channel for protecting adjacent channels and operators to be reduced. It could also be beneficial for the network to be able to manage the frequency location of the local oscillator being used by a particular user equipment, in conjunction with assigning a particular uplink channel to be used by the user equipment.

SUMMARY

The present application provides a method in a user equipment. The method includes informing the network of a capability of the user equipment to adjust a frequency location of a transmit local oscillator of the user equipment, to a frequency location which has been identified by the network, within a predefined channel frequency spectrum. The frequency location identification to be used to adjust the frequency location of the transmit local oscillator is received from the network. The frequency location of the local oscillator is adjusted in accordance with the frequency location identification received.

According to another possible embodiment, a user equipment in a communication network is provided. The user equipment includes a transceiver, and a controller that informs the network of a capability of the user equipment to adjust a frequency location of a transmit local oscillator of the user equipment, to a frequency location which has been identified by the communication network, within a predefined channel frequency spectrum. The frequency location identification to be used to adjust the frequency location of the transmit local oscillator is received by the user equipment via the transceiver from the network. The frequency location of the local oscillator is adjusted by the controller in accordance with the frequency location identification received.

According to a further possible embodiment, a method in a network entity is provided. The method includes receiving from the user equipment an indication informing the network entity of a capability of the user equipment to adjust a frequency location of a transmit local oscillator of the user equipment, to a frequency location which has been identified by the network, within a predefined channel frequency spectrum. The frequency location identification to be used to adjust the frequency location of the transmit local oscillator is transmitted to the user equipment.

According to a still further possible embodiment, a network entity for communicating with one or more user equipment is provided. The network entity includes a transceiver, and a controller that receives from the user equipment via the transceiver an indication informing the network entity of a capability of the user equipment to adjust a frequency location of a transmit local oscillator of the user equipment, to a frequency location which has been identified by the network, within a predefined channel frequency spectrum. The frequency location identification to be used to adjust the frequency location of the transmit local oscillator is transmitted by the controller to the user equipment via the transceiver.

These and other features, and advantages of the present application are evident from the following description of one or more preferred embodiments, with reference to the accompanying drawings.

BRIEF DESCRIPTION OF THE DRAWINGS

FIG. 2 is a table illustrating the additional requirements associated with network signaled 22 (NS_22) identified in a specification associated with the standard for evolved universal terrestrial radio access (E-UTRA), which is intended to address the coexistence cases for bands 42 and 43;

FIG. 3 is a table illustrating the additional requirements associated with carrier aggregation network signaled 8 (CA_NS_8) identified in a specification associated with the standard for evolved universal terrestrial radio access (E-UTRA);

FIG. 4 is a table illustrating additional maximum power reduction for network signaled 22 (NS_22);

FIG. 5 is a table illustrating additional maximum power reduction for carrier aggregation network signaled 8 (CA_NS_8);

DETAILED DESCRIPTION OF THE PREFERRED EMBODIMENT(S)

Figure 1:
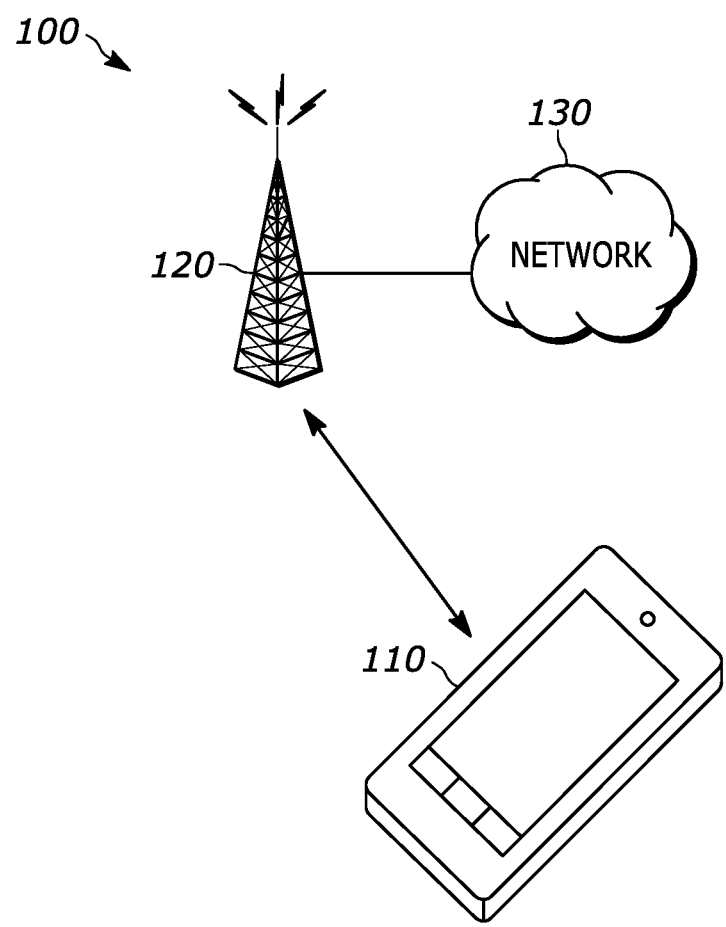
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for network assignment of the user equipment transmitter local oscillator frequency.

FIG. 1 is a block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In general, it would be beneficial to be able to reduce the additional maximum power reduction (A-MPR) that is needed for resource block (RB) locations at the edge of a channel to protect adjacent channels and operators from adjacent channel power from a transmission intended to operate within a particular channel. In particular, this could be beneficial for time division duplexing (TDD) bands due to the lack of coordination between operators with respect to the uplink and downlink time intervals, and also due to the increased flexibility within new radio (NR) to switch from uplink to downlink in flexible time slots and symbols.

Such an improvement could also be beneficial for frequency division duplexing (FDD) uplink and downlink bands, which are adjacent to TDD bands (for example, TDD band 38 lies between the FDD uplink and downlink spectrum for Band 7).

Previous RAN4 studies of TDD co-existence have shown that the A-MPR that may be required can be strongly dependent on the bandwidth of the carrier. Furthermore, studies of carrier aggregation have shown that the location of the transmitter local oscillator (LO) can strongly affect the MPR/A-MPR that is needed at the edge of the channel in order to protect the adjacent channel and/or band.

At least some embodiments of the present filing describe how the transmit LO could be centered within a channel or transmit bandwidth part in order to minimize the MPR/A-MPR to better meet emission requirements and/or to minimize the emissions into the adjacent channels and bands for a given MPR/A-MPR.

For TDD bands, one potential solution can include the use of contiguous carrier aggregation of a small bandwidth carrier with a large bandwidth carrier where the smaller bandwidth carrier is located more proximate to the boundary with another operator. However, such a method could require significant overhead in that each carrier has its own set of control channels, its own master information block (MIB) and system information block (SIB), its own synch channel, etc. Additionally, there is typically an internal guard band between the two component carriers which would purposely be unused.

In general, it can be desirable to minimize the unwanted emissions associated with an uplink transmission, where the unwanted emissions may include adjacent channel leakage and spurious emissions into adjacent channels and bands, as well as unwanted in-band emissions into other users. This can be especially true for TDD spectrum since adjacent channels may not be owned by the same operator, and thus the transmit and receive intervals may not be time aligned between the two operators. Note that this problem of alignment of the transmit and receive intervals may be even worse with the introduction of flexible slots and symbols with NR. There can also be a problem at the edge of TDD bands that are close to FDD spectrum, and in particular, if the TDD band is adjacent to a downlink band, since user equipment (UE) transmitting in the TDD band can more readily desense a UE that is receiving in an adjacent downlink band. Similarly, the UE that is transmitting in the FDD uplink can more readily desense a UE that is receiving in the adjacent TDD band.

The issue of potential interference between adjacent TDD channels has been extensively studied. RAN4 has also conducted studies of appropriate protection levels between adjacent TDD channels which led to the introduction of network signaled emissions limits for LTE band 42 and 43 both with and without carrier aggregation as shown in the tables from TS 36.101, which is illustrated in FIGS. 2 and 3. More specifically, FIG. 2 shows a table 200 illustrating the additional requirements associated with network signaled 22 (NS_22) identified in the specification associated with the standard for evolved universal terrestrial radio access (E-UTRA), which is intended to address the coexistence cases for bands 42 and 43. FIG. 3 shows a table 300, which is very similar, which illustrates the additional requirements associated with carrier aggregation network signaled 8 (CA_NS_08).

The A-MPR that is associated with these tables is shown in FIGS. 4 and 5, both with and without and carrier aggregation. More specifically, FIG. 4 includes a table 400 illustrating the additional maximum power reduction for network signaled 22. FIG. 5 includes a table 500 illustrating the additional maximum power reduction for carrier aggregation network signaled 8.

From these tables, it can be observed that the A-MPR needed to meet NS_22 requirements for a single component carrier and to meet CA_NS_08 for carrier aggregation can increase dramatically with bandwidth. For example, we can compare the A-MPR allowed when transmitting 5 RBs at the edge of a 20 MHz carrier with the A-MPR allowed when transmitting 5 RBs at the outer edge of two aggregated 20 MHz carriers. It can be observed that the A-MPR allowed for the first case is 3 dB, while the A-MPR allowed for the second case is 12 dB. So, at least one question is why should the A-MPR be 9 dB more to transmit the same 5 RBs at the edge of the 40 MHz carrier than at the edge of the 20 MHz carrier to meet the exact same requirement? It can also be observed that if a single 5 MHz component carrier (CC) is used, then no A-MPR may be required. Note that this NS-signaled requirement is not a requirement that scales with bandwidth like the adjacent channel leakage ratio. This is an absolute requirement in terms of both location and emissions level that is identified as being necessary to protect adjacent TDD or FDD spectrums.

At least one reason for the much larger A-MPR may be related to the location of the transmitter local oscillator (LO). The local oscillator location determines the location of the LO leakage and the IQ image. The greater the distance of the LO from the edge of the channel, the farther that the unwanted emissions can extend into the adjacent channel. This can be seen in FIG. 6. More specifically FIG. 6 is a graph 600 illustrating an exemplary frequency spectrum including the exemplary frequency location of a local oscillator, an exemplary resource block allocation, as well as a potential span for the presence of associated adjacent channel power including the span of third and fifth order intermodulations (IMs) in accordance with two different local oscillator frequency locations.

Figure 6:
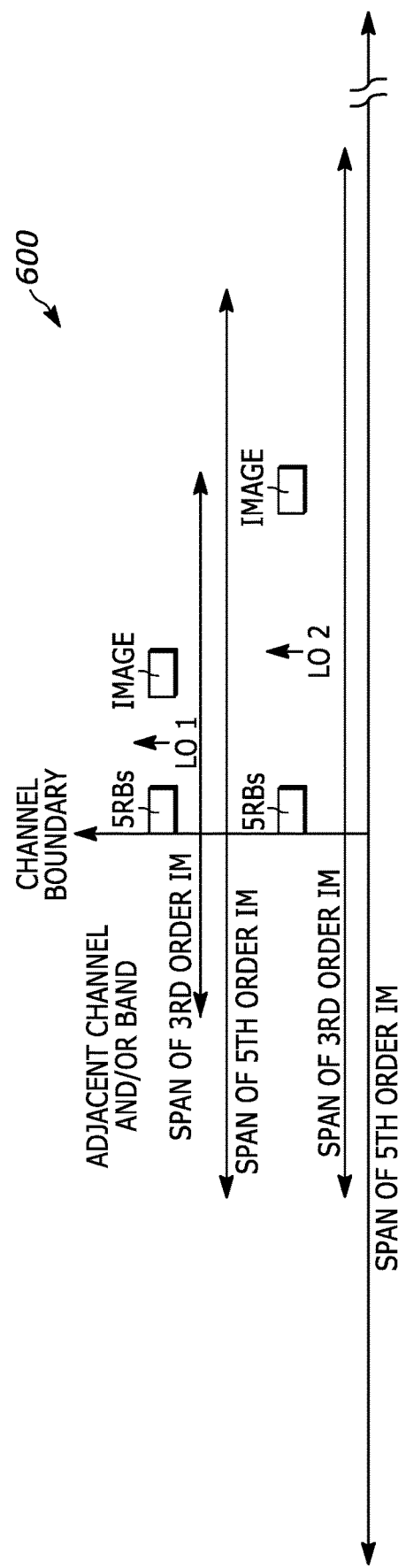
FIG. 6 is a graph illustrating an exemplary frequency spectrum including an exemplary frequency location of a local oscillator, an exemplary resource block allocation, as well as a potential span for the presence of associated adjacent channel power.

From FIG. 6 it can be seen that the third order IM with LO 2 extends as far into the adjacent channel/band as the fifth order IM for LO 1. Since the third order IM has much more power, there is much more interference from the third order IM with LO 2 than there is from the fifth order IM with LO 1. Additionally, the fifth order IM with LO 1 extends much farther into the adjacent channel/band than does the fifth order IM with LO 1. So, in order to reduce the interference into the adjacent channel and band, it would be beneficial to position the location of the transmitter LO closer to the edge of the channel with the RB allocation.

Figure 7:
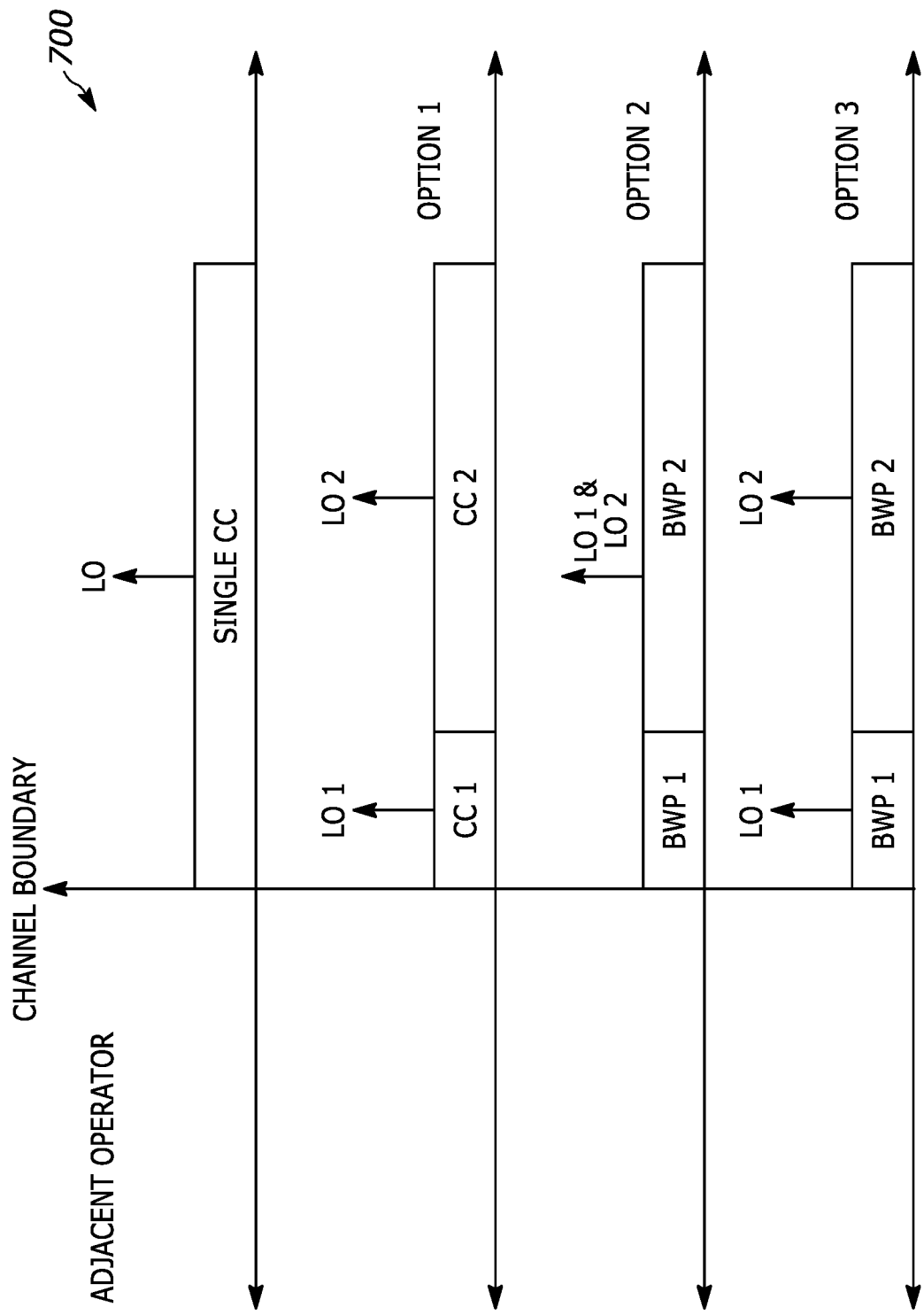
FIG. 7 is a graph illustrating a couple of exemplary options for minimizing interference into an adjacent channel and/or operator.

One way that one might address this problem is with carrier aggregation. In order to protect the spectrum of operators in adjacent channels and bands, carrier aggregation can be used as indicated in Option 1 of FIG. 7. With such a configuration, contiguous carrier aggregation can be between a smaller carrier at the edge of the band and a larger carrier next to it. A UE can access the entire downlink spectrum using downlink carrier aggregation (CA), while the adjacent operator can be protected using only one of the two uplinks. However, there may be drawbacks with such an approach. For example, the use of carrier aggregation can introduce significant overhead in that each carrier has its own set of control channels, its own MIB and SIB, its own synch channel, etc. Additionally, there is typically an internal guard band between the two component carriers which is unused.

In new radio (NR), bandwidth parts can be introduced into the specification for multiple reasons including to reduce current drain as well as to segregate different types of services. Bandwidth parts can also provide another way to limit interference into the adjacent channel and band as indicated in Options 2 and 3, wherein a smaller bandwidth part can be used at the bottom (i.e. more proximate to the channel boundary) of the channel to try to limit interference. In this example, it is assumed that each UE is assigned only a single bandwidth part on the uplink, though it may have multiple bandwidth parts on the downlink.

In both of these two options, there are two bandwidth parts with the smaller bandwidth part at the bottom of the channel. In Option 2, both the first UE using bandwidth part 1 for its uplink and the second UE using bandwidth part 2 for its uplink place their LO in the center of the channel. In the Option 3, each UE places its transmitter LO at the center of its bandwidth part. Now from the example considered above with NS_22 and CA_NS_08, the A-MPR will be the same as for the UE using bandwidth part 1 in Option 2 as for a UE using a single component carrier covering the same channel. Conversely, if the UE using bandwidth part 1 moves its transmit LO to the center of bandwidth part 1, the A-MPR needed to meet NS_22 or CA_NS_08 requirements will be greatly reduced and will be the same as for a UE using CC1 in Option 1. Thus from the example described above, the A-MPR needed for Option 3 will be 9 dB less than for Option 2 for a 5 RB allocation at the bottom of the channel.

From the above, it can be seen that there is a benefit in putting smaller bandwidth parts at the edge of the channel and instructing the UE to place the LO at the center of the bandwidth part. Specifically, the A-MPR needed to protect adjacent channels and/or operators can be reduced.

Currently, the UE reports the location of its transmitter LO to the network in order for the in-band emissions requirements to be defined, since otherwise the test equipment does not know where to place the in-band emissions relaxations for the LO leakage and I/Q image. However, there is currently no requirement on where the LO is placed. From the discussion above, it can be seen that it would be beneficial for the UE to be able to place the LO in the center of the bandwidth part in order to reduce the extent to which emissions can extend into adjacent channels and operators, or alternatively, to reduce the A-MPR required to meet the same emissions requirements. For TDD bands, this may necessitate that UE be able to have separate LOs for the transmitter and the receiver.

Based on the above, in accordance with a first embodiment, the present inventor has proposed that i) a UE capability be defined for being able to set its transmit LO to an arbitrary location specified by the network for FDD bands; and ii) a UE capability be defined for being able to set its transmit LO to an arbitrary location specified by the network for TDD bands (may require separate transmit and receive LOs).

In combination with this, there could be signaling from the network to the UE to indicate where the UE transmit LO should be placed.

Based on the above, in accordance with a second embodiment, the present inventor has alternatively proposed, to define a somewhat reduced UE capability in which i) a UE capability is defined for being able to set its transmit LO in the center of a specified transmit bandwidth part for FDD bands; and ii) a UE capability is defined for being able to set its transmit LO in the center of a specified transmit bandwidth part for TDD bands (requires separate transmit and receive LOs).

In combination with this embodiment, there would be signaling from the network to the UE to indicate in which bandwidth part the UE should center its transmit LO.

Finally, it may be necessary to define MPR/A-MPR to meet emissions requirements for bandwidth parts of different size placed at the edges of channel and bands.

It may be further possible in order to avoid the need for signaling, that the UE locate its LO in the center of the transmit bandwith part (assuming there is only one), or in the center of the aggregated bandwidth parts (assuming these are contiguous) if there is more than one bandwith part. Alternatively, it may not be required that the LO be in these locations, but the MPR/A-MPR requirements could be based on these assumptions.

There may also be a capability definition in the UE's time required to move the transmitter LO as bandwidth parts are activated and deactivated. This could again be a separate capability for FDD and TDD bands.

All of the above could require signaling for the UE to indicate its capability as well as signaling for the network to indicate the UE the location at which the transmitter LO should be placed.

In general, the UE is allowed to determine the location of its transmitter LO, and this is a reason the UE reports the location of its LO, in order for the in-band emissions requirements to be defined. The in-band requirements allow emission relaxations for the LO leakage and I/Q image, and the locations of these depend on the location of the UE transmitter LO.

There is currently no requirement on the UE's placement of its transmitter LO with respect to the location of its transmit bandwidth parts or parts. By setting the location of the UE transmitter LO properly, the UE can better meet adjacent channel emissions requirements with reduced MPR/A-MPR.

The present disclosure relates to reducing emissions into adjacent carriers and operators, which can be particularly beneficial for TDD cases since the uplink and downlink transmission intervals are not coordinated between different operators. The presently disclosed embodiments better help to reduce the emissions into adjacent channels for the same A-MPR and/or reduce the A-MPR needed to achieve a given emissions level.

Figure 8:
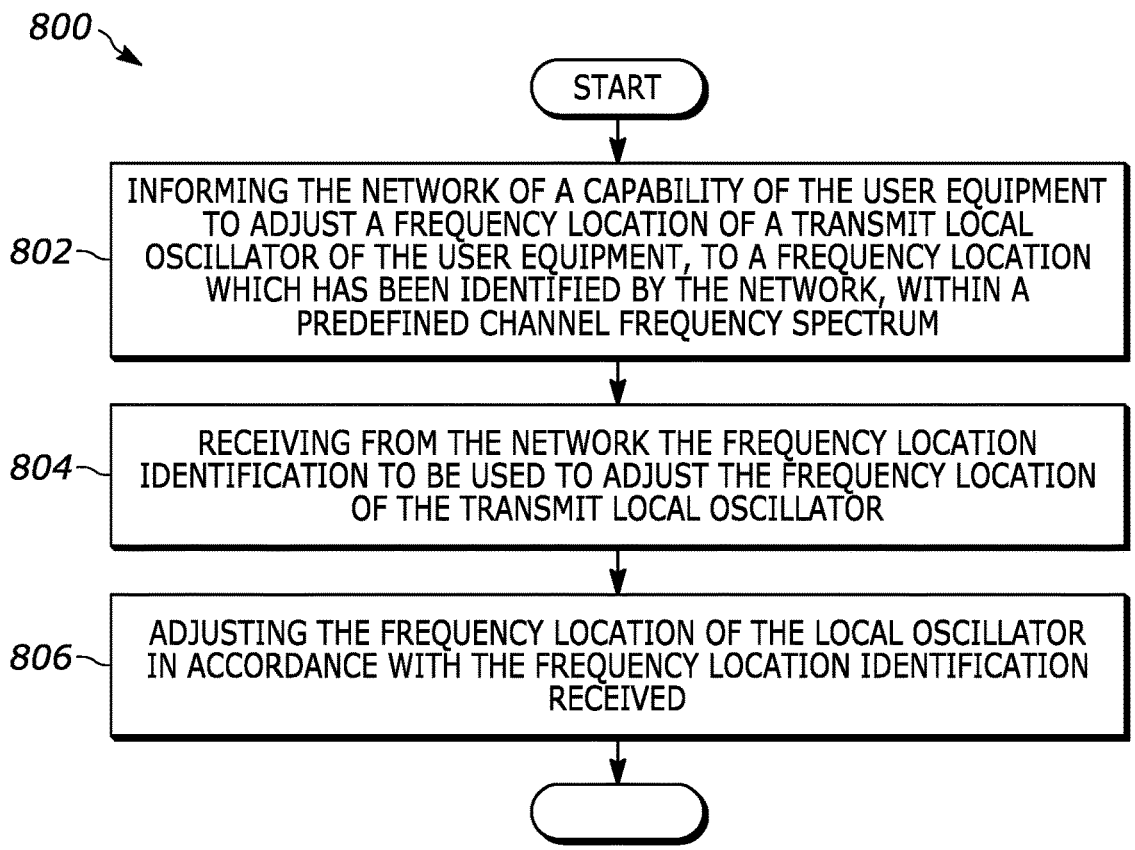
FIG. 8 is a flow diagram in a user equipment for the network assignment of the user equipment transmitter local oscillator frequency.

FIG. 8 illustrates a flow diagram 800 in a user equipment for the network assignment of the user equipment transmitter local oscillator frequency. The method includes informing 802 the network of a capability of the user equipment to adjust a frequency location of a transmit local oscillator of the user equipment, to a frequency location which has been identified by the network, within a predefined channel frequency spectrum. The frequency location identification to be used to adjust the frequency location of the transmit local oscillator is received 804 from the network. The frequency location of the local oscillator is adjusted 806 in accordance with the frequency location identification received.

In some instances, the predefined channel frequency spectrum can be organized into one or more channels. In some of these instances, the frequency location, which has been identified by the network, can correspond to a center of an identified one of the one or more channels. The one or more channels can include multiple aggregated channels, and the frequency location, which has been identified by the network, can correspond to a center of the multiple aggregated channels. The frequency location, which has been identified by the network, can correspond to an identified frequency location within one of the one or more channels. The one or more channels can include multiple channels, which can include a smaller channel and a larger channel, where the smaller channel can be located within the channel frequency spectrum more proximate to an edge of the channel frequency spectrum that is near an adjacent channel.

In some instances, the predefined channel frequency spectrum can be organized into one or more bandwidth parts. In some of these instances, the frequency location, which has been identified by the network, can correspond to a center of an identified one of the one or more bandwidth parts. The one or more bandwidth parts can include multiple aggregated bandwidth parts, and the frequency location, which has been identified by the network, can correspond to a center of the multiple aggregated bandwidth parts. The frequency location, which has been identified by the network, can correspond to an identified frequency location within one of the one or more bandwidth parts. The one or more bandwidth parts can include multiple bandwidth parts, which can include a smaller bandwidth part and a larger bandwidth part, where the smaller bandwidth part can be located within the channel frequency spectrum more proximate to an edge of the channel frequency spectrum that is near an adjacent channel.

In some instances, the frequency location of the local oscillator can be adjusted with an identified required time frame.

In some instances, the user equipment can provide to the network a parameter value associated with the rate at which the local oscillator can be adjusted.

In some instances, the one or more channels are in a time division duplex band. In some instances, the one or more channels are in a frequency division duplex band.

In some instances, the method can further comprise using an additional maximum power reduction in connection with transmitting a signal using the local oscillator having the adjusted frequency location, based on the additional maximum power reduction being defined for at least one of the adjusted frequency location of the local oscillator, or an associated portion of the predefined channel frequency spectrum.

In some instances, if the UE LO location corresponds to the LO location used to define A-MPR/MPR for a channel bandwidth smaller than the channel bandwidth for the UE, and if the RB allocation falls within the corresponding smaller channel bandwidth for which the A-MPR/MPR has been defined, then the UE may be limited to the A-MPR/MPR for the smaller bandwidth. In particular, the UE may be limited to the A-MPR/MPR PR for the smaller bandwidth if the A-MPR/MPR for the smaller channel bandwidth is less than the A-MPR/MPR for the larger channel bandwidth. If the A-MPR/MPR for the smaller channel bandwidth is not less than the A-MPR/MPR for the larger channel bandwidth for all RB allocations falling within both bandwidths, then the UE may be required to use the A-MPR/MPR for the smaller channel bandwidth only for RB allocations for which the A-MPR/MPR for the smaller channel bandwidth is less than the A-MPR/MPR for the larger channel bandwidth.

Figure 9:
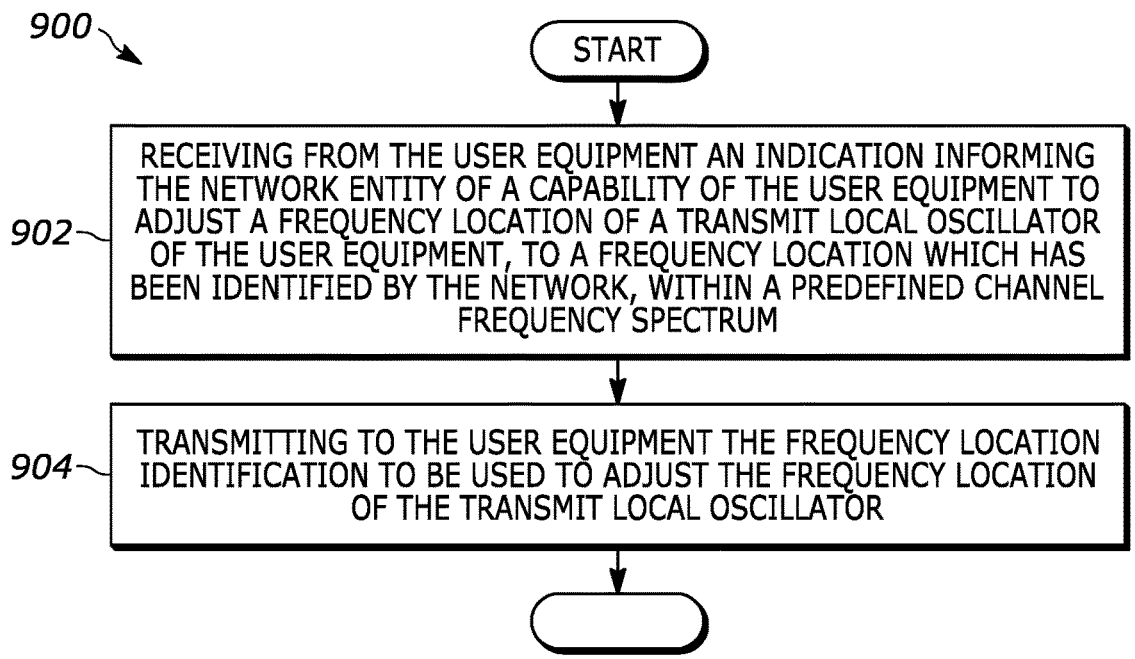
FIG. 9 is a flow diagram in a network entity for the network assignment of the user equipment transmitter local oscillator frequency.

FIG. 9 illustrates a flow diagram 900 in a network entity for the network assignment of the user equipment transmitter local oscillator frequency. The method includes receiving 902 from the user equipment an indication informing the network entity of a capability of the user equipment to adjust a frequency location of a transmit local oscillator of the user equipment, to a frequency location which has been identified by the network, within a predefined channel frequency spectrum. The frequency location identification to be used to adjust the frequency location of the transmit local oscillator is transmitted 904 to the user equipment.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
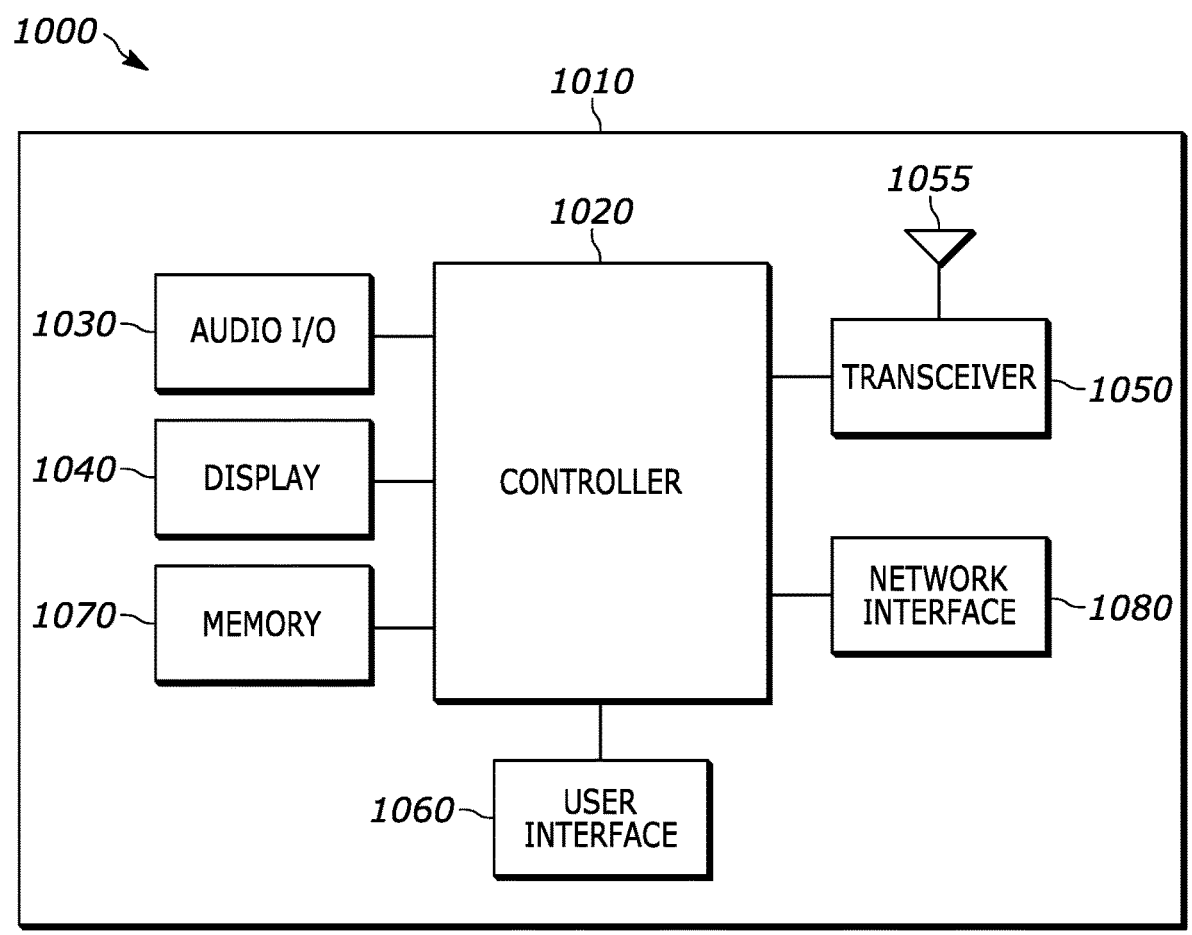
FIG. 10 is an example block diagram of an apparatus according to a possible embodiment.

FIG. 10 is an example block diagram of an apparatus 1000, such as the wireless communication device 110, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can perform the methods described in all the embodiments.

The display 1040 can be a viewfinder, a liquid crystal display (LCD), a light emitting diode (LED) display, a plasma display, a projection display, a touch screen, or any other device that displays information. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1070 can include a random access memory, a read only memory, an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method, performed by a user equipment (UE), wherein the UE is capable of adjusting a frequency location of a transmit local oscillator of the UE, to a frequency location that has been indicated by a network, within a predefined channel frequency spectrum, the method comprising:
   receiving from the network the indicated frequency location to be used to adjust the frequency location of the transmit local oscillator; and
   adjusting the frequency location of the transmit local oscillator of the UE in accordance with the indicated frequency location received,
   wherein a controller adjusts the frequency location of the transmit local oscillator of the UE.

2. The method in accordance with claim 1, wherein the predefined channel frequency spectrum is organized into one or more channels.

3. The method in accordance with claim 2, wherein the frequency location, which has been indicated by the network, corresponds to a center of an identified one of the one or more channels.

4. The method in accordance with claim 3, wherein the one or more channels includes multiple aggregated channels, and wherein the frequency location, which has been indicated by the network, corresponds to a center of the multiple aggregated channels.

5. The method in accordance with claim 2, wherein the frequency location, which has been indicated by the network, corresponds to an identified frequency location within one of the one or more channels.

6. The method in accordance with claim 1, wherein the predefined channel frequency spectrum is organized into one or more bandwidth parts.

7. The method in accordance with claim 6, wherein the frequency location, which has been indicated by the network, corresponds to a center of an identified one of the one or more bandwidth parts.

8. The method in accordance with claim 7, wherein the one or more bandwidth parts includes multiple aggregated bandwidth parts, and wherein the frequency location, which has been indicated by the network, corresponds to a center of the multiple aggregated bandwidth parts.

9. The method in accordance with claim 6, wherein the frequency location, which has been indicated by the network, corresponds to a default frequency location for a transmit local oscillator which is a center frequency of a bandwidth part.

10. The method in accordance with claim 6, wherein the one or more bandwidth parts includes multiple bandwidth parts, which include a smaller bandwidth part and a larger bandwidth part, where the smaller bandwidth part is located within the channel frequency spectrum more proximate to an edge of the channel frequency spectrum that is near an adjacent channel.

11. The method in accordance with claim 1, wherein the frequency location of the transmit local oscillator is adjusted with an identified required time frame.

12. The method in accordance with claim 1, wherein the UE provides to the network a parameter value associated with a rate at which the transmit local oscillator can be adjusted.

13. The method in accordance with claim 2, wherein the one or more channels are in a time division duplex band.

14. The method in accordance with claim 2, wherein the one or more channels are in a frequency division duplex band.

15. The method in accordance with claim 1, further comprising using an additional maximum power reduction in connection with transmitting a signal using the transmit local oscillator having the adjusted frequency location, based on the additional maximum power reduction being defined for at least one of the adjusted frequency location of the transmit local oscillator, or an associated portion of the predefined channel frequency spectrum.

16. A user equipment (UE), which is capable of adjusting a frequency location of a transmit local oscillator of the UE, to a frequency location that has been indicated by a communication network, within a predefined channel frequency spectrum, the UE comprising:
   a transceiver that receives the indicated frequency location to be used to adjust the frequency location of the transmit local oscillator from the communication network; and
   a controller that adjusts the frequency location of the transmit local oscillator of the UE in accordance with the indicated frequency location received from the communication network.

17. The UE in accordance with claim 16, wherein the predefined channel frequency spectrum is organized into one or more channels.

18. The UE in accordance with claim 16, wherein the predefined channel frequency spectrum is organized into one or more bandwidth parts.

19. The UE in accordance with claim 16, wherein the transceiver has separate local oscillators for transmit and receive.

20. A method, performed by a communication network, which is capable of indicating a frequency location within a predefined channel frequency spectrum to adjust a frequency location of a transmit local oscillator of a user equipment (UE), the method comprising:
   receiving from a UE an indication informing the communication network of a capability of the UE to adjust the frequency location of the transmit local oscillator of the UE, to the frequency location which has been indicated by the communication network, within a predefined channel frequency spectrum; and
   transmitting the indicated frequency location to adjust the frequency location of the transmit local oscillator.

* * * * *